(12) United States Patent
Adami et al.

(10) Patent No.: US 7,963,178 B2
(45) Date of Patent: Jun. 21, 2011

(54) FORK LIFT TRUCK WITH AXLE LOAD DETERMINATION FOR A REAR-END AXLE

(75) Inventors: Peter Adami, Leidersbach (DE); Mark Hanke, Leidersbach (DE); Hermann Hartmann, Großostheim (DE)

(73) Assignee: Linde Material Handling GmbH (DE)

( * ) Notice: Subject to any disclaimer, the term of this patent is extended or adjusted under 35 U.S.C. 154(b) by 555 days.

(21) Appl. No.: 11/820,296

(22) Filed: Jun. 19, 2007

(65) Prior Publication Data

US 2008/0031715 A1 Feb. 7, 2008

(30) Foreign Application Priority Data

Jun. 22, 2006 (DE) .......................... 10 2006 028 551

(51) Int. Cl.
*G01D 7/00* (2006.01)
*G01L 1/22* (2006.01)
*B62D 7/18* (2006.01)

(52) U.S. Cl. ......... 73/862.041; 73/862.043; 73/862.473; 73/862.474; 280/93.512

(58) Field of Classification Search .......... 73/862.041–862.045; 280/93.512
See application file for complete search history.

(56) References Cited

U.S. PATENT DOCUMENTS

| | | | | |
|---|---|---|---|---|
| 4,046,218 A | * | 9/1977 | Blaisdell et al. | 280/86.75 |
| 4,137,990 A | * | 2/1979 | Abels | 280/124.111 |
| 5,186,042 A | * | 2/1993 | Miyazaki | 73/862.041 |
| 5,503,030 A | * | 4/1996 | Bankestrom | 73/862.627 |
| 6,037,550 A | * | 3/2000 | Bradley | 177/136 |
| 6,050,770 A | | 4/2000 | Avitan | |
| 6,170,341 B1 | * | 1/2001 | Avitan | 73/862.392 |
| 6,385,518 B1 | | 5/2002 | Rickers et al. | |
| 6,651,518 B1 | * | 11/2003 | Miyazaki | 73/862.044 |
| 6,712,170 B2 | * | 3/2004 | Panizzolo | 180/283 |
| 6,769,315 B2 | * | 8/2004 | Stevenson et al. | 73/862.629 |
| 7,093,843 B2 | * | 8/2006 | Varela et al. | 280/93.512 |
| 7,097,184 B2 | * | 8/2006 | Kapaan et al. | 280/93.512 |
| 7,614,629 B2 | * | 11/2009 | Dinakaran et al. | 280/93.512 |
| 2003/0172740 A1 | * | 9/2003 | Stevenson et al. | 73/794 |
| 2004/0207170 A1 | * | 10/2004 | Kapaan et al. | 280/93.512 |

FOREIGN PATENT DOCUMENTS

| | | |
|---|---|---|
| DE | 3422837 | 1/1986 |
| DE | 3802502 | 8/1989 |
| DE | 19910285 | 9/2000 |
| DE | 19919655 A1 | 11/2000 |
| DE | 10010011 | 2/2001 |
| EP | 0312390 | 4/1992 |
| EP | 1167638 | 1/2002 |
| GB | 2246864 A * | 2/1992 |
| GB | 2355244 A | 4/2001 |

* cited by examiner

*Primary Examiner* — Lisa M Caputo
*Assistant Examiner* — Jonathan Dunlap
(74) *Attorney, Agent, or Firm* — The Webb Law Firm

(57) ABSTRACT

A fork lift truck has a rear-end axle provided with a measuring device to determine the axle load. To enable the axle load to be determined using simple means which are reliable in operation, at least one shearing force detector (2 or 3) or normal force detector (6) in the form of a structural component and arranged in the force flux is integrated into the axle.

3 Claims, 2 Drawing Sheets

FORK LIFT TRUCK WITH AXLE LOAD DETERMINATION FOR A REAR-END AXLE

CROSS REFERENCE TO RELATED APPLICATION

This application claims priority to German Application No. 10 2006 028 551.4, filed Jun. 22, 2006, which application is herein incorporated by reference in its entirety.

BACKGROUND OF THE INVENTION

1. Field of the Invention

The invention relates to a fork lift truck with a rear-end axle which is provided with a measuring device to determine the axle load.

2. Technical Considerations

A fork lift truck of the general type defined (i.e., counterbalanced fork lift truck with front-end lifting means and rear-end counterweight) is disclosed in DE 34 22 837 A1. Depending on the axle load detected, the drive system of the fork lift truck is controlled so as to limit the braking delay during forward travel and the acceleration during rearward travel. This is carried out for the purpose of preventing the fork lift truck from tilting about its front axle.

To determine the axle load in the fork lift truck, it is possible to measure by means of a travel sensor the distance between the rear-end axle, which is in the form of a steering axle, and the counterweight, which represents a component of the vehicle frame and on which the axle is mounted. As an alternative thereto, it is possible to measure the perpendicular forces at the bearing locations of the axle by means of pressure sensors. Finally, in the above-mentioned publication it is also indicated as a further alternative to measure the axle load on the axle body itself, this being effected by measuring elastic deformations of the axle body by means of strain gauges.

SUMMARY OF THE INVENTION

The present invention is based on the object of making available a fork lift truck of the general type indicated in the introduction, but which with means which are simple and reliable in operation enables as accurate as possible determination of the axle load of the rear-end axle to be achieved.

This object is achieved according to the invention in that at least one shearing force or normal force detector in the form of a structural component and arranged in the force flux is integrated into the axle.

An aspect of the invention lies in designing an axle component so that, in addition to its supporting function, it is also active within the axle as a shearing force or normal force detector, i.e., as a measuring member into which are directed shearing or normal forces which can be detected by one or more measuring cells mounted in or on the measuring member.

By using at least one shearing force detector or at least one normal force detector in accordance with the invention as an integral component of the axle, the outlay required for determining the axle load is minimized. It is not necessary in this case for individual strain gauges to be stuck to the axle, electrically interconnected and then laboriously calibrated. Instead, the shearing force detector and/or the normal force detector represent preassembled structural components of the axle, which are ready to be installed and provided with measuring cells so as to enable shearing forces or normal forces to be measured.

The shearing force detector and/or normal force detector can here be connected with the axle, for example, by force fit or screw connections or in any other suitable manner and can be integrated therein as an axle component which is arranged in the force flux. It is then merely necessary for the measuring cells of the shearing force detector and/or normal force detector to be electrically connected to a signal evaluation unit by means of (standard) plugs and leads.

Therefore, in a fork lift truck according to the invention, the axle can be provided in a simple manner with axle load determination. For this purpose, no modifications to the vehicle frame are required, for example to the counterweight, or to the axle suspension. As a result of the axle load determination, it is possible to increase the safety of the fork lift truck in respect of tipping over forwards by restricting certain vehicle functions. It is then possible, for example with decreasing axle load, to limit any forward tipping movement of the lift frame.

The invention can be applied both to four-wheeled and three-wheeled fork lift trucks.

According to an advantageous configuration of the invention, at least one shearing force detector can be integrated into a centre axle body of the axle mounted on the vehicle frame. By replacing the centre axle body of the axle of a conventional fork lift truck with one provided with axle load determination, i.e., a centre axle body equipped with sensors, the possibility of retrofitting is provided in a simple manner.

In a further development of the invention, the shearing force detector may take the form of a supporting body with two integrally formed coaxial pendulum journals which are spaced apart in the longitudinal direction of the vehicle and which are provided for the suspension of the axle on the vehicle frame. Therefore, the shearing force detector in the form of a supporting body represents an important structural element of the axle, which is situated in the force flux.

Advantageously, adjacent each pendulum journal, a respective measuring cell recess is incorporated in the supporting body. In each of the measuring cell recesses is disposed a measuring cell which can measure shearing forces, thereby forming a double shearing force detector. Irrespective of whether or not the pendulum journals are uniformly loaded, the axle load is always produced by adding the shearing forces measured by the two measuring cells.

In addition to the above-described one-piece embodiment of the shearing force detector, a multipart embodiment is also possible, in which each pendulum journal is integrally formed on a separate shearing force detector which in each case represents an independent structural component.

According to another, not less advantageous configuration of the invention, the axle may take the form of a steering axle which has two steerable stub axles which are each designed as shearing force detectors. Therefore, also in this embodiment the principle of shearing force measurement to determine the axle load applies, wherein the shearing force detectors take the form of stub axles. By replacing the stub axles (and optionally the wheel hubs) with stub axles which are in the form of shearing force detectors it is possible for the axle to be retrofitted with axle load determination.

In this embodiment, it is proposed to incorporate a measuring cell recess in the stub axles in each case axially between a king pin and a wheel hub mounting. Owing to this arrangement, the stub axle forms a shear beam, wherein the shearing forces acting thereon in the vicinity of the measuring cell recess are measured by a measuring cell. In this case, the shearing force measured by a measuring cell is independent of the wheel contact point on the carriageway.

Finally, according to another favorable configuration of the invention, it is also possible for the axle to be in the form of a steering axle which has two king pins which are each designed as normal force detectors. Therefore, the wheel contact force is determined by measuring the normal force in the king pin of the associated stub axle. In this embodiment of the invention too, the possibility of retrofitting is provided by replacing the conventional king pins with king pins which are designed as normal force detectors.

Advantageously, a measuring cell recess can be incorporated in the normal force detectors in each case in a portion arranged outside a stub axle.

Of course, in all the instances described above, it is also possible, in addition to the shearing force detector and/or normal force detector, for sensors to be provided, for example for bending moment measurement and/or tension-compression measurement, by means of which moments and/or forces can be determined which correct the axle load measuring signal detected and possibly corrupted during pure shearing force and/or normal force measurement.

BRIEF DESCRIPTION OF THE DRAWINGS

Further advantages and details of the invention will be explained in more detail with reference to the exemplified embodiments illustrated in the schematic figures, in which.

DESCRIPTION OF THE PREFERRED EMBODIMENTS

Figure 1:
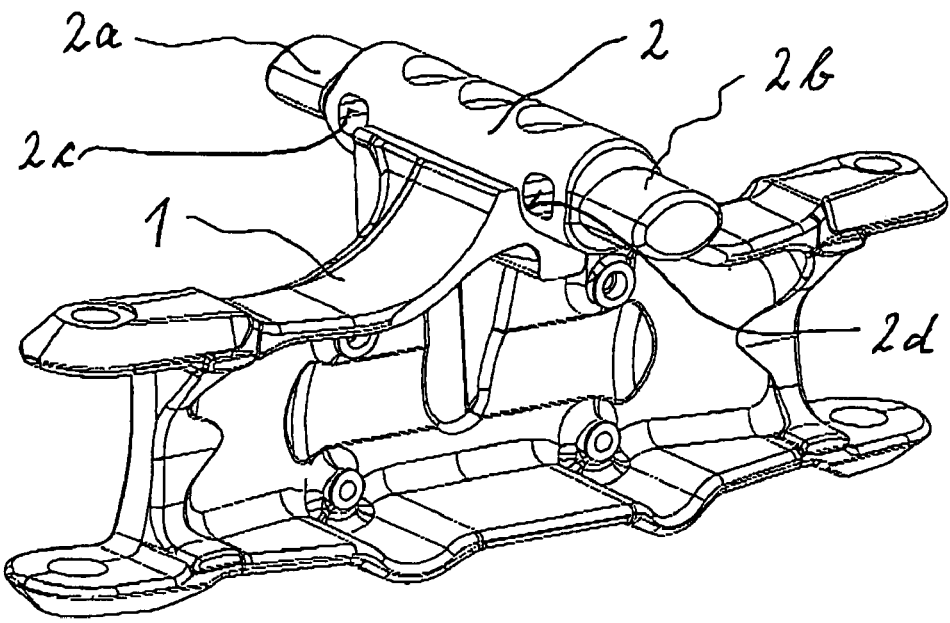
FIG. 1 shows a view in perspective of a centre axle body of a fork lift truck according to the invention.

FIG. 1 shows the centre axle body 1 of a rear-end axle of a four-wheeled fork lift truck according to the invention, the axle being in the form of a steering axle. As already mentioned, the invention can also be used in three-wheeled fork lift trucks. A shearing force detector in the form of a supporting body 2 is mounted, for example bolted, on the centre axle body 1 and, as a structural component, forms an integral constituent of the centre axle body 1 and thereby forms the axle. The shearing force detector 2 thus serves not only to determine the axle load, as will be described, but represents an axle component arranged in the force flux, by means of which the axle is suspended in pendulum fashion on a vehicle frame (not illustrated in the drawings) of the fork lift truck, for example counterweight as part of the vehicle frame.

Figure 2:
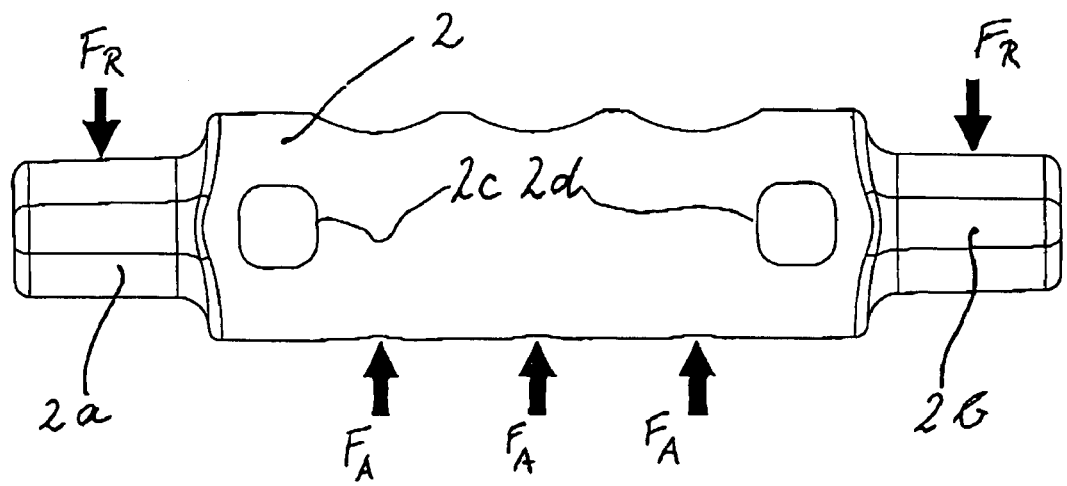
FIG. 2 shows a side view of a shearing force detector in the form of a supporting body of the centre axle body.

For the purpose indicated, the shearing force detector 2 (see also FIG. 2) is provided with two integrally formed coaxial pendulum journals 2a, 2b which are spaced apart in the longitudinal direction of the vehicle and which are provided for engagement in elastic axle bearings connected to the vehicle frame.

Adjacent to each pendulum journal 2a and 2b a respective measuring cell recess 2c and 2d is incorporated in the shearing force detector 2, in each of which recesses there is disposed for axle load determination a measuring cell (not illustrated in the drawings) for measuring shearing forces. A double shearing force detector is thereby created, in which the axle forces $F_A$ are directed into the shearing force detector 2 axially between the two measuring cell recesses 2c, 2d. The supporting forces $F_R$ of the vehicle frame act on the pendulum journals 2a, 2b. The sum of the shearing forces measured in the measuring cells, which corresponds to the axle load, does not depend here on the positions at which the axle forces $F_A$ are directed into the shearing force detector 2.

Figure 3:
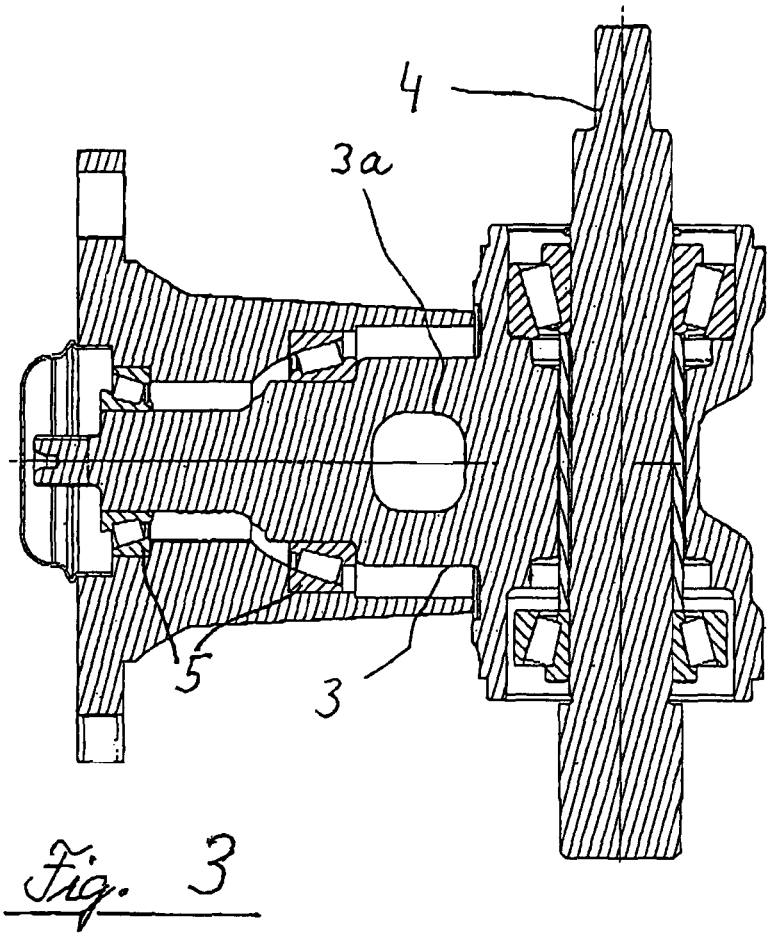
FIG. 3 shows a section through a shearing force detector in the form of a stub axle.

In the variant of embodiment of the fork lift truck of the invention according to FIG. 3, which shows a section through one of the two steerable stub axles of the axle designed as a steering axle, each stub axle is in the form of a shearing force detector 3. In this case a measuring cell recess 3a is incorporated in the stub axle/shearing force detector 3 in a zone axially between a king pin 4 and a wheel hub mounting 5, a measuring cell (not illustrated in the Figure) being disposed in said recess. In this embodiment, the shearing forces measured by the measuring cell are independent of the force-transmission point (wheel contact point on the carriageway).

Of course, it is also possible to measure shearing forces at other suitable locations of the axle and, for this purpose, to design structural components of the axle wholly or partly as shearing force detectors.

Figure 4:
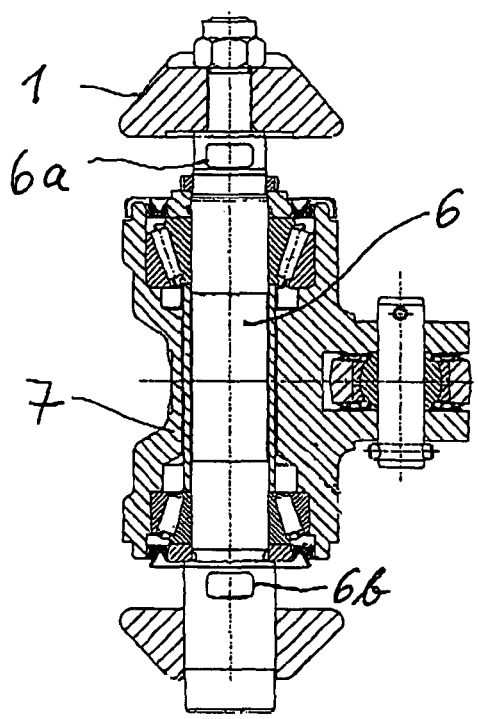
FIG. 4 shows a section through a normal force detector in the form of a king pin.

In the variant of embodiment of the fork lift truck of the invention according to FIG. 4, which shows a section through the zone between the axle centre body 1 and a stub axle 7, the king pin takes the form of a normal force detector 6. In this case, a respective measuring cell recess 6a and 6b is incorporated in the king pin/normal force detector 6 in a portion projecting respectively upwardly and downwardly from the stub axle 7, a measuring cell (not illustrated in the Figure) measuring normal forces being disposed in each recess. The wheel contact force is thus measured directly in the king pin/normal force detector 6.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A fork lift truck, comprising:
a rear-end axle provided with a measuring device to determine an axle load, wherein at least one shearing force detector in the form of a structural component and arranged in a force flux is integrated into the axle,
wherein at least one shearing force detector is integrated into a centre axle body of the axle mounted on a vehicle frame,
wherein the shearing force detector comprises a supporting body with two integrally formed coaxial pendulum journals which are spaced apart in the longitudinal direction of the vehicle and which are provided for the suspension of the axle on the vehicle frame, the supporting body fixedly mounted to the centre axle body and restricted from movement relative to the centre axle body, and
wherein adjacent each pendulum journal a respective measuring cell recess is incorporated in the supporting body.

2. A fork lift truck, comprising:
a rear-end axle provided with a measuring device to determine an axle load, wherein at least one shearing force detector in the form of a structural component and arranged in a force flux is integrated into the axle, and
wherein the axle is a steering axle which has two steerable stub axles which are each designed as shearing force detectors, and a measuring cell recess incorporated in the stub axles axially between a king pin and a wheel hub mounting.

3. A fork lift truck, comprising:
a rear-end axle provided with a measuring device to determine an axle load, wherein at least one normal force detector in the form of a structural component and arranged in a force flux is integrated into the axle, and wherein the axle is a steering axle which has two king pins which are each designed as normal force detectors, and wherein a respective measuring cell recess is incorporated in the normal force detectors in a portion arranged outside a stub axle in a direction that extends along a longitudinal axis of the respective king pins.

* * * * *

UNITED STATES PATENT AND TRADEMARK OFFICE
CERTIFICATE OF CORRECTION

PATENT NO. : 7,963,178 B2  
APPLICATION NO. : 11/820296  
DATED : June 21, 2011  
INVENTOR(S) : Peter Adami et al.

Page 1 of 1

It is certified that error appears in the above-identified patent and that said Letters Patent is hereby corrected as shown below:

Title Page, Column 1, Inventors, Line 3, "Großostheim (DE)" should read -- Großostheim (DE) --

Column 5, Line 5, Claim 3, "axle, and" should read -- axle, --

Signed and Sealed this
Eighth Day of November, 2011

David J. Kappos
*Director of the United States Patent and Trademark Office*